July 22, 1958  E. F. SAGER ET AL  2,843,892
APPARATUS FOR MAKING SHELL-TYPE MOLDS
Filed May 6, 1953  8 Sheets-Sheet 1

INVENTORS
Earl Sager and
Arthur N. Tuttle.
BY
Albert J. Henderson
THEIR ATTORNEY INVENTORS
Earl Sager and
Arthur N. Tuttle.
BY
THEIR ATTORNEY

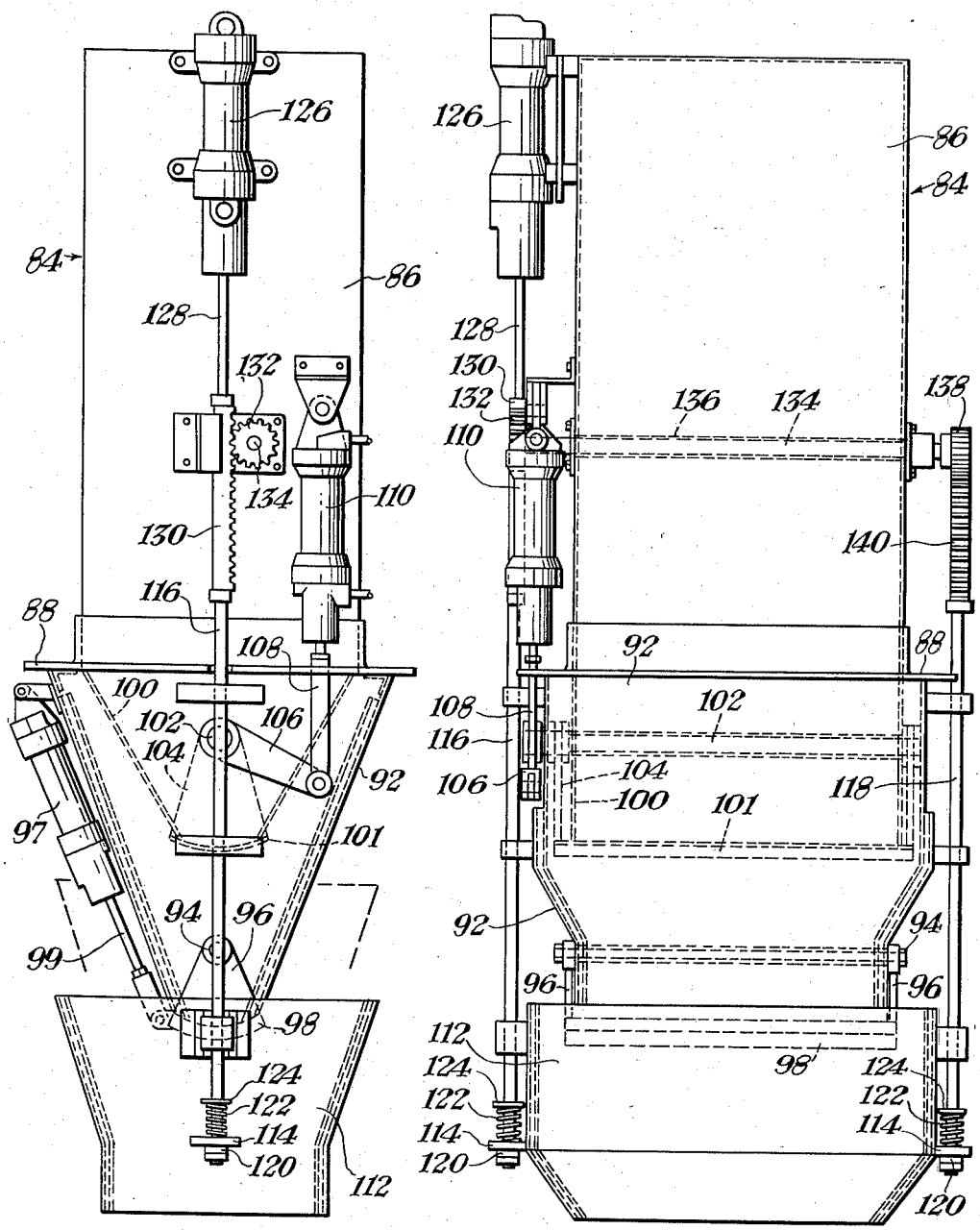

INVENTORS
Earl Sager and
Arthur N. Tuttle.
BY
THEIR ATTORNEY

July 22, 1958 E. F. SAGER ET AL 2,843,892
APPARATUS FOR MAKING SHELL-TYPE MOLDS
Filed May 6, 1953 8 Sheets-Sheet 7

INVENTORS
Earl Sager and
Arthur N. Tuttle.
BY
THEIR ATTORNEY

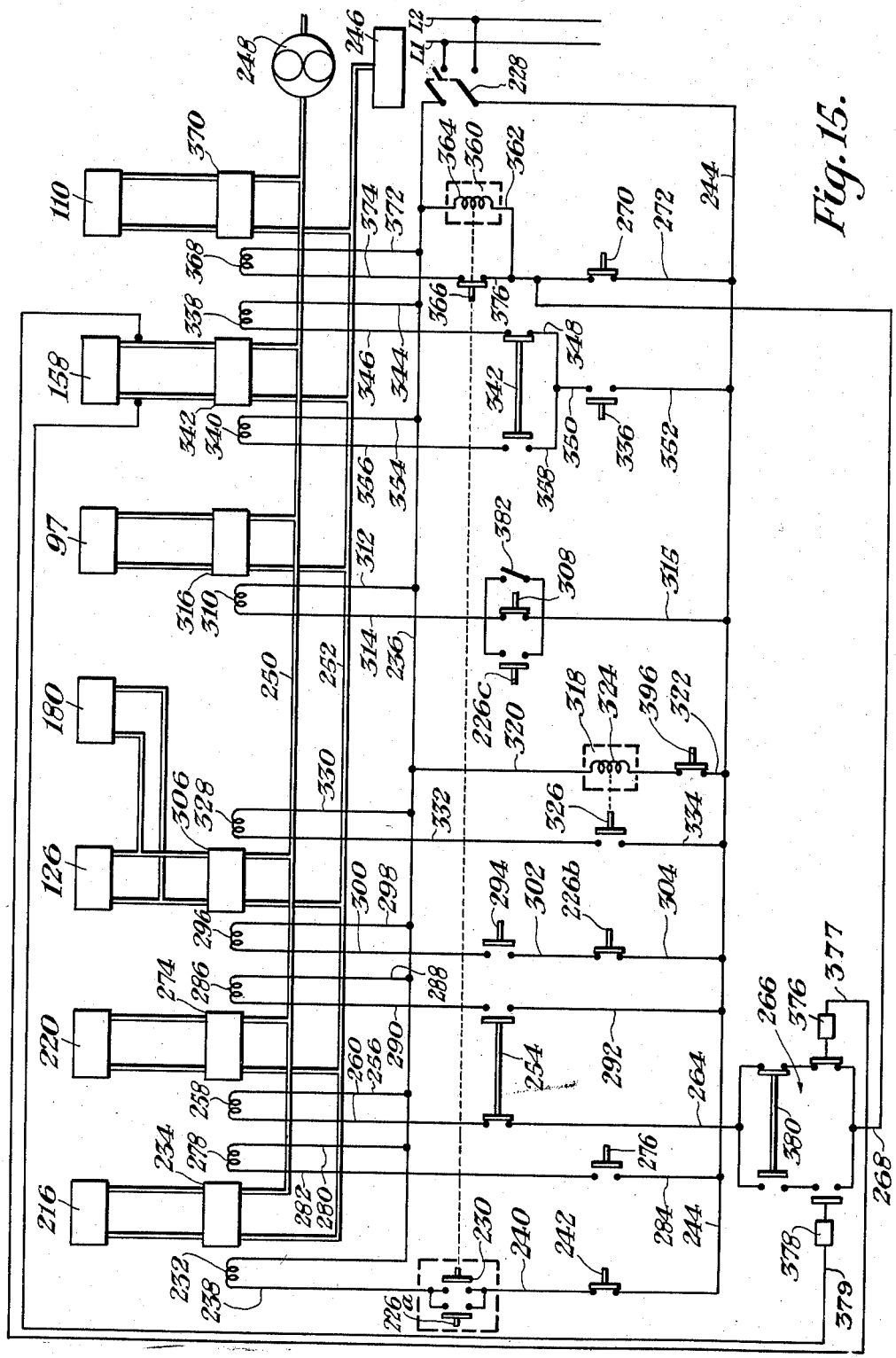

United States Patent Office 2,843,892
Patented July 22, 1958

2,843,892

APPARATUS FOR MAKING SHELL-TYPE MOLDS

Earl F. Sager and Arthur N. Tuttle, Greensburg, Pa., assignors to Walworth Company, Boston, Mass., a corporation of Massachusetts Application May 6, 1953, Serial No. 353,368

14 Claims. (Cl. 22—20)

This invention relates to foundry mold forming apparatus and more particularly to apparatus for continuously producing baked shell-type molds by a sequence of automatic mold forming operations.

The molds to be formed by operation of the apparatus herein disclosed are produced from a dry mixture of inorganic molding material such as sand and a minor portion of plastic binder. The dry mixture is applied to pattern means which have been preheated to a temperature sufficiently high to cause the binder to soften and cement the particles of molding material together to thereby build up a shell of the desired thickness. After the mold forming material has remained on the pattern for a time sufficient to form the shell, the pattern is inverted to dump excess molding material. Each pattern then passes through a curing zone maintained at elevated temperatures and proceeds to an unloading station where the baked molds are ejected from the patterns, the pattern thereafter moving through a preheating zone to the original loading station for further mold forming operations.

The component parts of the mold forming apparatus of this invention may be summarized as follows:

A. An endless conveyer mounted on spaced sprocket means and adapted to pivotally support pattern means for moving the same through a predetermined path.

B. Oven means divided into a preheating oven and a curing oven.

C. Mechanism for loading mold forming material on the pattern means at the loading station.

D. Mechanism for inverting loaded pattern means for dumping excess mold forming material therefrom.

E. Mechanism for ejecting the finished mold from the pattern means at the unloading station after passage through the curing oven.

F. Mechanism for indexing the conveyer and pattern means from a loading station through the curing oven, an unloading station, the preheat oven and back to the loading station.

The apparatus of this invention is of particular advantage in forming molds of the described shell-type in large quantities. Since the molds can be set aside after completion and even stored for long periods of time before being used in casting processes, the continuous production feature of the apparatus may be put to full use at any convenient time. The apparatus may be operated under the control of one person and is of relatively simple nature embodying uncomplicated parts which are durable and rugged as required in general foundry practice.

A principal object of the invention is to produce foundry molds by relatively unskilled labor without detracting from the quality of the molds so produced.

Another object of the invention is to continuously repeat the cycle of mold producing operations with different patterns if desired or with like patterns where high production rate of a specified type of mold is required.

Another object of this invention is to increase the productivity of automatic mold forming machines.

Other objects and advantages will become apparent from the following description taken in connection with the accompanying drawings wherein:

Fig. 4 is an enlarged elevation of the apparatus at the loading station;

Fig. 5 is an end view corresponding to Fig. 4;

Fig. 15 is a schematic layout of the fluid pressure and electrical control systems of the apparatus.

The various parts of the apparatus will now be described referring more particularly to the drawings.

*The conveyer*

Figure 1:
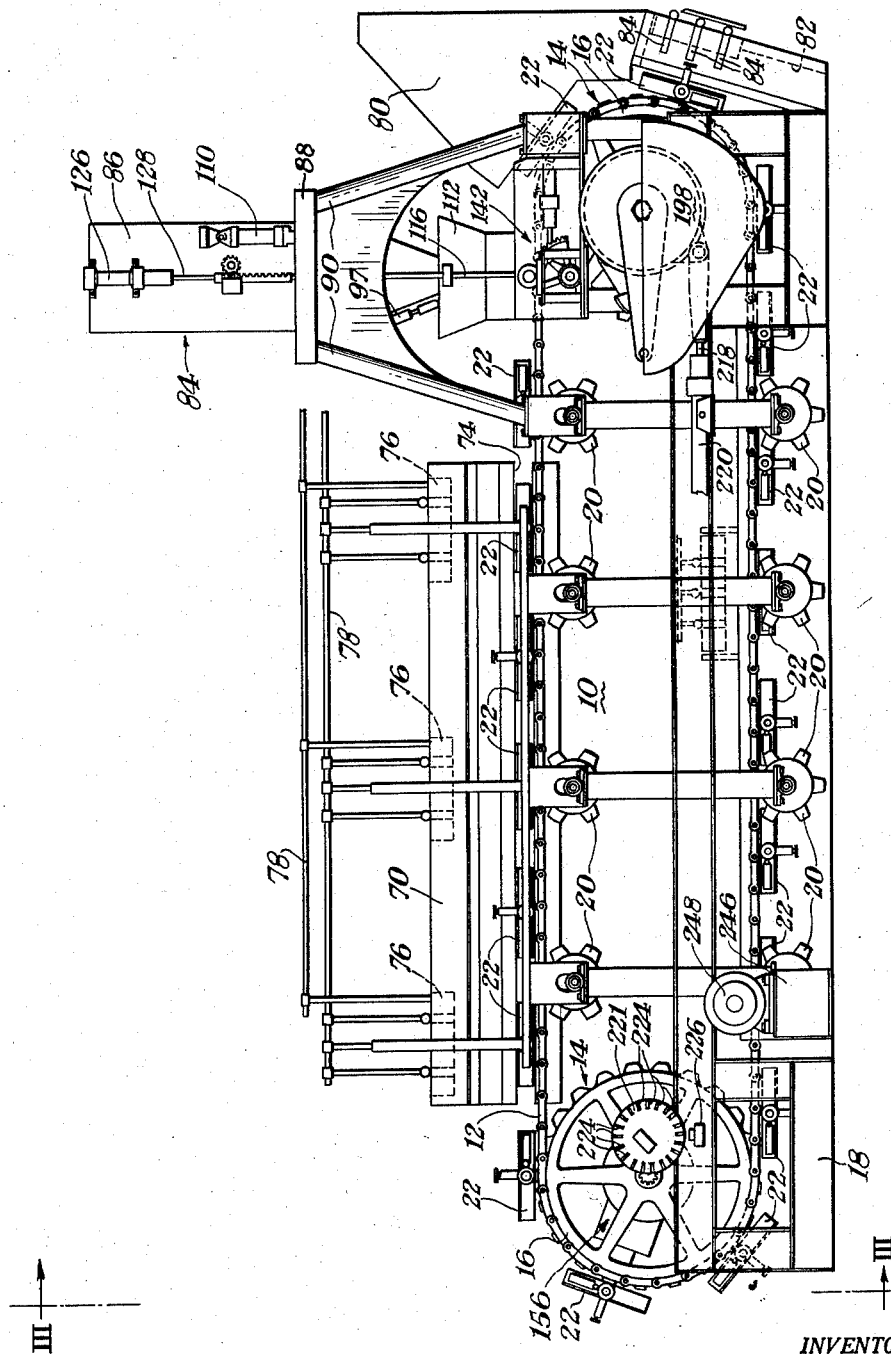
Fig. 1 is an elevation in a somewhat schematic form of a mold forming apparatus embodying this invention.
Figure 2:
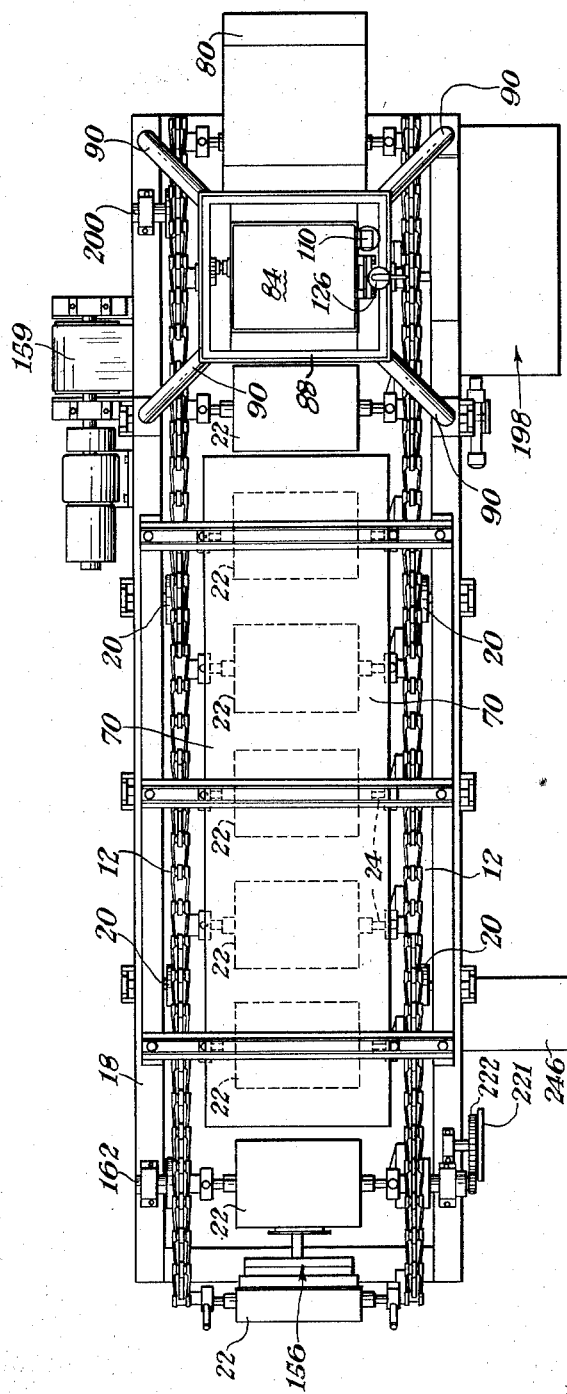
Fig. 2 is a plan view of the molding apparatus shown in Fig. 1.
Figure 3:
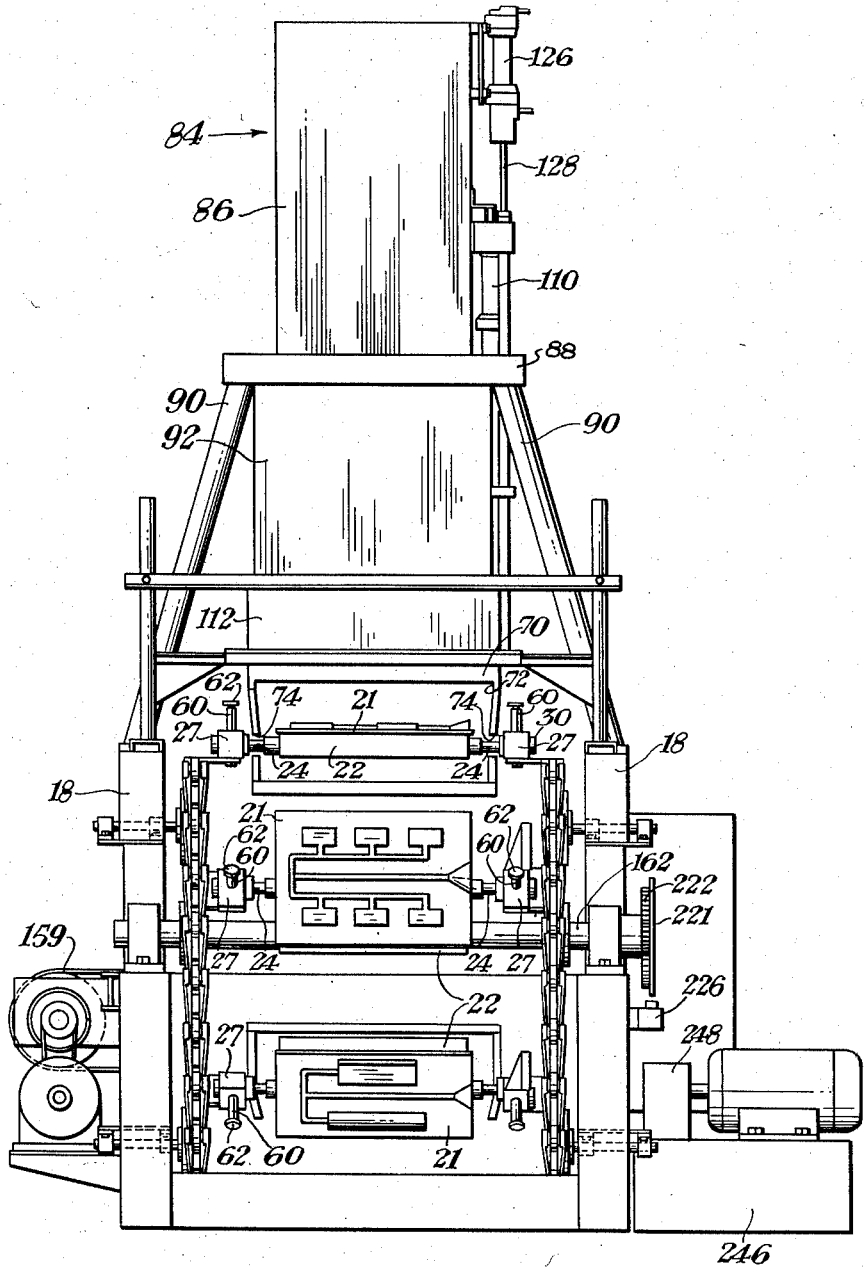
Fig. 3 is an end view of the apparatus shown in Fig. 1 looking in the direction indicated by the lines III—III in Fig. 1.

As best shown in Figs. 1, 2 and 3, a conveyer, designated generally by the reference numeral 10, is provided and comprises a pair of endless chains 12 mounted on spaced sprocket means 14. Each sprocket means 14 comprises a pair of spaced parallel gear wheels 16 which are axially aligned and rotatably mounted on a suitable frame 18. The chains 12 are preferably of the closed-link and roller type and are mounted on the gear wheels 16 so that the gear teeth thereof extend into the spaces between the chain rollers in a manner well known in the art.

A plurality, in this instance eight, supplemental gear wheel or sprocket sets 20 are journaled in the frame 18 at spaced points intermediate the main gear wheels 16. The supplementary gear wheels 20 are positioned beneath the chains 12 to mesh with the same and prevent sagging thereof.

Figure 8:
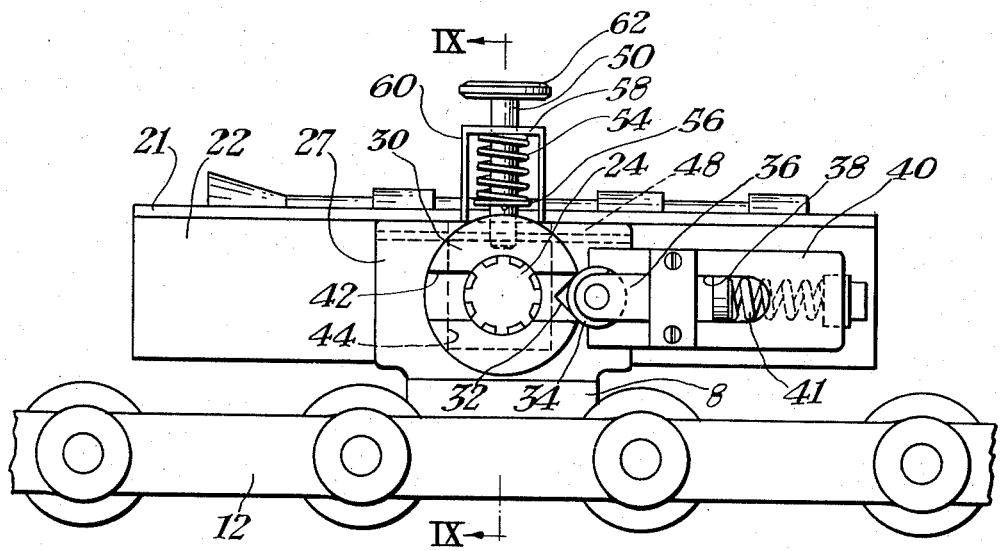
Fig. 8 is an enlarged fragmentary elevation of the conveyer and mechanism for supporting the pattern means.
Figure 9:
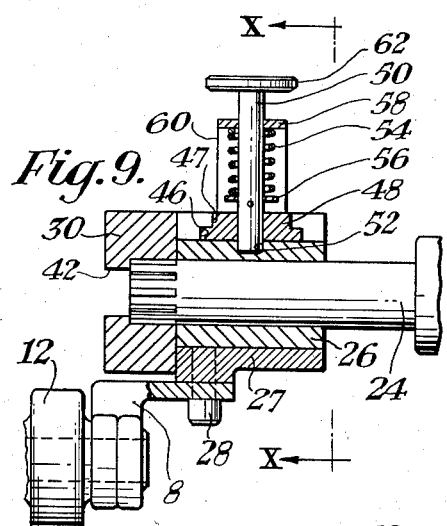
Fig. 9 is a fragmentary sectional view taken on the lines IX—IX of Fig. 8.
Figure 10:
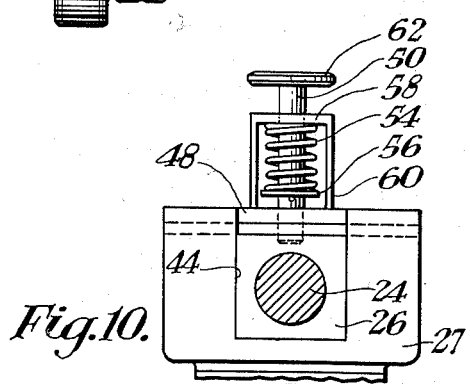
Fig. 10 is a sectional view taken on the line X—X of Fig. 9.

Pivotally mounted at spaced intervals between the chains 12 is a plurality, in this instance twenty, of pattern support means. As best shown in Figs. 8, 9 and 10, each of these support means comprises a generally rectangular frame 22 adapted to support a pattern plate 21 and having a pair of oppositely disposed trunnions 24 extending therefrom. Each trunnion 24 is journaled in a bearing block 26 and each bearing block 26 is mounted in a support 27 which is secured by any suitable means, such as bolts 28, to an angle plate 8 mounted between a pair of adjacent rollers on one of the chains 12. Each trunnion 24 extends completely through its associated bearing block 26 and carries on its outer end an annular detent element 30.

The trunnion 24 and element 30 are suitably splined to prevent relative rotation therebetween. The outer periphery of the annular element 30 is notched at 32 for the reception of a roller 34. The roller 34 is rotatably mounted on a latching bar 36 slidably mounted in a groove 38 formed in an extension 40 of the bearing support 27. A spring 41 acts between the extension 40 of the support 27 and the latching bar 36 to urge the roller 34 into engagement with the annular detent element 30. Thus, when the various parts of the mechanism are in the position shown in Fig. 8, with the roller 34 seated in the notch 32 of the annular element 30, rotational movement of the frame 22 above the axis of the trunnions 24 is prevented.

The outer face of each annular detent element 30 is provided with a transversely extending generally rectangular groove 42 which is adapted to receive the actuating element of a pattern roll-over mechanism operable for overcoming the latching effect of the detent mechanism operable for overcoming the latching affect of the detent mechanism hereinbefore described. The details of the roll-over mechanism will be more fully described hereinafter.

The bearing block support 27 is constructed to permit removal of the bearing block 26 therefrom with a minimum of effort. To this end, the support 27 is formed in the shape of a block having a recess 44 of rectangular cross-section formed therein. The recess 44 is proportioned to snugly receive the bearing block 26.

A second recess 46 is formed in the support 27 and extends across the upper portion thereof at right angles to the recess 44. The walls of the recess 46 are shouldered at 47 to provide a bearing surface for an elongated locking element 48 of generally T-shaped cross-section. The locking element 48 is slidable in the recess 46 and serves to prevent withdrawal of the bearing block 26 from the recess 44.

Means is provided for securing the locking element 48 in place and the same comprises a pin 50 extending through the locking element 48 and adapted to extend into a recess 52 formed in the bearing block 26. The pin 50 is biased into the recess 52 by a spring 54 acting between the collar 56 on the pin 50 and a spring seat 58 secured to the bearing support 27 by a plurality of straps 60.

A handle 62 is carried by the outer end of the pin 50 and may be manually manipulated to move the pin 50 against the bias of the spring 54, thereby moving the pin 50 out of the recess 52 in the bearing block 26 and freeing the locking element 48 for slidable movement in the bearing support 27.

With the above-described mechanism for mounting the pattern plate support frame 22 on the chains 12, it will be apparent that patterns may be quickly changed without interrupting the operation of the conveyer 10 simply by removing the entire pattern support frame 22 and substituting therefor a different frame with the desired pattern plate mounted thereon. To effect this rapid change of patterns, the pins 50, associated with the pattern support frame which is to be removed, are retracted against the bias of their springs 54 by manual manipulation and are thereby withdrawn from their associated bearing blocks 26. The locking elements 48 are then slid out of the bearing supports 27. The entire assembly of the pattern support frame 22, trunnions 24, bearing blocks 26, and detent element 30 may then be lifted out of the bearing supports 27. A similar assembly may then be inserted in the supports 27 and the locking elements 48 returned to their initial position where the pin 50 will drop into the recess 52 ofthe bearing block 26.

The ovens

A curing oven 70 of generally rectangular form is positioned above the conveyer 10 on suitable extensions of the frame 18. The ends of the oven 70 are open and a passageway 72 of substantially rectangular cross-section extends completely through the oven 70. Longitudinally extending slots 74 are formed in the side walls of the oven 70 and are so located that the trunnions 24 which support the pattern support frames 22 may pass therethrough and in so doing carry the support frames 22 through the oven passage 72.

Heating means for the curing oven 70 take the form of a plurality of gas burners 76 located within the passageway 72 above the conveyer 10. The burners 76 may be supplied with gaseous fuel from a source of supply (not shown) through a plurality of manifolds 78 extending along the exterior of the over 70. Suitable thermostatic controls (not shown) may control the fuel supply to the burners 76 to maintain the various portions of the oven 70 at the desired curing temperatures.

A preheat oven 80 is positioned adjacent one end of the conveyer 10 for heating patterns as the same are moved from the lower portion of the conveyer 10 to the upper portion thereof. The preheat oven 80 is provided with a passageway 82 of substantially rectangular cross-section having an open end which extends toward the conveyer 10. Heat is supplied to the interior of the passageway 82 by suitable gas burners 84 positioned therein.

Mechanism for loading mold forming material on the patterns

Positioned between the ends of the curing oven 70 and the preheat oven 80 and directly above the conveyer 10 at what may be termed the loading station is a hopper for the molding material designated generally by the reference numeral 84. The hopper 84 comprises a generally rectangular container 86 having a flange 88 extending therefrom. The flange 88 is secured to a plurality, in this instance four, of supports 90 converging upwardly from the frame 12 and serves to support the container 86 directly above the conveyer 12. The lower portion of the container 86 is tapered to form a generally funnel-shaped open-ended wall 92.

A shaft 94 extends transversely through the wall 92 and the outer ends thereof pivotally support a pair of plates 96 each of which is in the shape of a segment of a circle with the arcuate edge thereof remote from the shaft 94. An arcuate plate 98 is carried by the arcuate edges of the plates 96 and underlies the open end of the funnel-shaped wall 92 to effectively close the same.

Means is provided for moving the arcuate plate 98 about the axis of the shaft 94 to open or close the lower end of the funnel-shaped wall 92 as desired. This means takes the form of a fluid pressure motor 97 pivotally connected at one end to the wall 92 and having a piston 99 pivotally connected to the arcuate plate 98. It will be apparent that reciprocation of the piston 99 will swing the arcuate plate 98 between positions effective to permit or prevent flow of material from the interior of the funnel-shaped wall 92.

Positioned within the container 86 above the arcuate gate plate 98 is a second gate plate 101 which normally closes the open end of a second generally funnel-shaped wall 100 extending across the interior of the container 86. A shaft 102 extends transversely through the wall 100 and the outer ends thereof pivotally support a pair of plates 104 each of which is in the shape of a segment of a circle with the arcuate edge thereof remote from the shaft 102. The plate 101 is arcuate in section and is secured to the arcuate edges of the plates 104 so that it may swing across the open end of the funnel-shaped wall 100 upon oscillation of the shaft 102 and plates 104.

Means is provided for swinging the gate plate 101 about the axis of the shaft 102. This means is here shown as comprising a lever arm 106 secured at one end to the shaft 102 to rotate therewith and having the other end thereof pivotally connected to a reciprocable piston 108 of a fluid pressure motor 110. The fluid motor 110 is pivotally mounted on the container 86 so that upon reciprocation of the piston 108, the shaft 102 and plates 104 will be oscillated to swing the gate plate 101 across the lower open end of the funnel-shaped wall 100 to permit or prevent flow of mold forming material therethrough.

With the gate arrangement disclosed, predetermined quantities of mold forming material may be discharged from the hopper 84 by sequential operation of the motors 97, 110. Operation of the motor 110 to move the gate plate 101 to the open position will permit mold forming material to drop into the space beneath the funnel-shaped wall 100 where it will be retained by the gate plate 98. Operation of the motor 110 to move the gate plate 101 to closed position and subsequent operation of the motor 97 to move the gate plate 98 to open position will permit that portion of the mold forming material disposed within the funnel-shaped wall 92 between the gates 98 and 101 to fall through the open end of the wall 92 and onto a pattern supported by the conveyer 12.

To insure retention of mold forming material on the pattern when such material is dropped thereon, a movable flask 112 is provided and the same is adapted to be moved into engagement with the pattern plates 21 prior to deposition of mold forming material thereon. The flask 112 comprises a generally rectangular open ended box mounted beneath the container 86 for vertical reciprocation relative thereto. Extending from opposite sides of the flask 112 is a pair of apertured lugs 114 through which a pair of reciprocable supporting shafts 116, 118 slidably extend. The shafts 116, 118 are slidably mounted along the sides of the container 86 and have suitable abutments in the form of nuts 120 on the lower ends thereof to prevent withdrawal from the apertured lugs 114. A coil spring 122 acts between each lug 114 and a suitable collar 124 secured to each shaft 116, 118 to provide a resilient mounting for a purpose which will become more apparent hereinafter.

Motor means is provided for reciprocating the shafts 116, 118, and the flask 112 supported thereby, and is here shown as a fluid pressure motor 126 having a piston 128 connected to the shaft 116 through a rack 130. The rack 130 meshes with a pinion 132 carried on one end of a rotatable shaft 134 which is journaled in a housing 136 extending transversely through the container 86. The other end of the shaft 134 carries a pinion 138 which meshes with a rack 140 secured to the upper end of the shaft 118. Thus, reciprocation of the piston 128 of the motor 126 will cause reciprocation of the shaft 116 connected directly thereto and also of the shaft 118 through the rack 130, pinion 132, shaft 134, pinion 138, and rack 140. Consequently, both shafts 116, 118 will effect reciprocation of the flask 112 from opposite sides.

The motor 126 is mounted on the side of the container 86 and the hereinbefore described connections between the motor 126 and the flask 112 are so proportioned that operation of the motor 126 to move the flask 112 from the broken line position as shown in Fig. 4 to the position shown in the drawings, will move the flask 112 into engagement with a pattern plate supported on the conveyer 10 and positioned beneath the hopper 84 in the loading station. The length of these connections is preferably such that the flask 112 will engage a pattern plate prior to completion of the stroke of the piston 128 so that further movement of the piston 128 will compress the springs 122 thereby providing a resilient connection between the motor 126 and the pattern. With such an arrangement, the flask 112 will adjust itself to compensate for any possible misalignments between the flask and the pattern so that snug seating of the flask on the pattern is assured without complicated clamping mechanisms.

Pattern inverting mechanism

Figure 11:
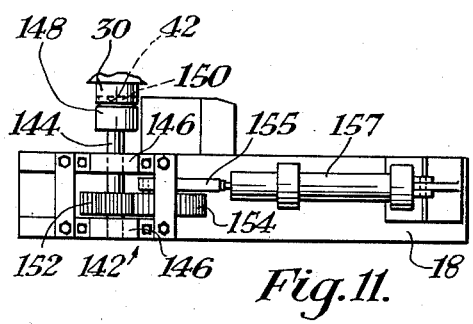
Fig. 11 is a fragmentary plan view of the dumping apparatus.
Figure 12:
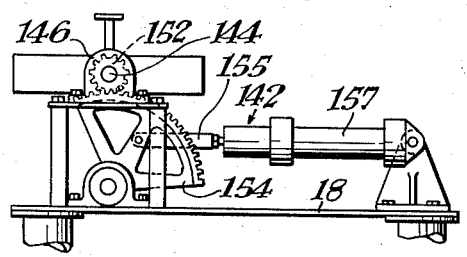
Fig. 12 is an elevation corresponding to Fig. 11.

Positioned between the curing oven 70 and the preheat oven 80 and here shown as positioned beneath the hopper 84 at the loading station is a pattern inverting mechanism, indicated generally by the reference numeral 142 for dumping excess mold forming material from the patterns. This mechanism is best shown in Figs. 11 and 12 and comprises a shaft 144 journaled at opposite ends in a pair of bearings 146 adjacent the upper runs of the chains 12. One end of the shaft 144 extends out of the adjacent bearing 146 toward one of the chains 12 and has formed thereon an enlarged end portion 148. Extending across the end face of the end portion 148 is a generally rectangular boss or key 150 which is shaped and oriented to slide into the groove 42 of the detent element 30 on each pattern support frame 22 as the chains 12 move the latter into alignment with the shaft 144 at the loading station.

A pinion 152 is carried on the shaft 144 between the bearings 146 and meshes with a quadrant gear 154 which is pivotally mounted on a suitable portion of the frame 18 beneath the shaft 144. Pivotally secured to the quadrant gear 154 is a piston 155 of a fluid motor 157. The motor 157 is pivotally mounted on an extension of the frame 18 so that reciprocation of the piston 155 thereof will cause oscillation of the quadrant gear 154 about its axis.

The gear ratio between the quadrant gear 154 and the pinion 152 is preferably such that movement of the quadrant gear 154 through 90° will produce a 360° movement of the pinion 152. Thus, a single stroke of the piston 155 will invert a pattern support frame 22 and return the same to its initial position by rotation in one direction. The next pattern support frame 22 which moves into engagement with the key 150 will then be inverted by rotation in the opposite direction as the piston 155 makes its return stroke. Pattern roll-over and dumping of excess mold forming material is therefore accomplished in a smooth and simple manner without undue jarring of the pattern and mold.

A conveyer 159 is disposed beneath the roll-over mechanism 142 and serves to remove excess mold forming material dumped from the patterns.

In an alternative form of the apparatus, the pattern inverting mechanism 142 may be located between the hopper 84 and the entrance to the curing oven 70. With such an arrangement, a pattern may be inverted after it moves from beneath the hopper and while another pattern is positioned beneath the hopper. Thus pattern loading and roll-over may be accomplished simultaneously and the production cycle shortened to increase the productivity of the apparatus.

Mold ejecting mechanism

Figures 13, 14:
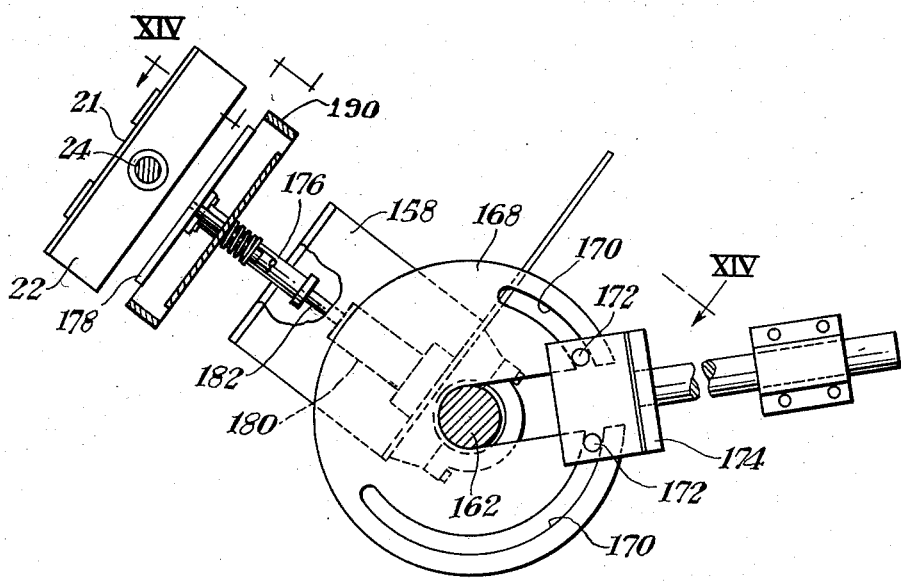
Fig. 13 is a fragmentary elevation of the ejecting means.
Fig. 14 is a fragmentary plan view taken on the line XIV—XIV of Fig. 13.

Positioned beyond the exit of the curing oven 70 at the extreme left of the apparatus, as viewed in Figs. 1 and 2, in what may be termed the unloading station, is a mold ejecting mechanism designated generally by the reference numeral 156. As best shown in Figs. 13 and 14, the ejecting mechanism 156 comprises a cylindrical housing 158 supported on a saddle 160 clamped on an axle 162 which supports one pair of the main conveyor gear wheels 16. The saddle 160 is secured to the axle 162 by a pair of semi-circular cap members 164 which extend around the axle 162 and are secured to the saddle 160 by a plurality of bolts 166.

The cylindrical housing 158 extends radially from the axle 162 and is prevented from pivotal movement thereon when the bolts 166 are tightened. However, the cylindrical housing 158 may be adjusted to extend along any selected radius of the axle 162 by loosening the bolts 166, adjusting the housing 158 and retightening the bolts 166. Such adjustment is limited to a practical range by a circular limit plate 168 mounted on the axle 162 for rotation relative thereto with the housing 158. A pair of arcuate slots 170 formed in the plate 168 slidably receive a pair of pins 172 rigidly mounted on the suitable bracket 174 which is fixed by any suitable means (not shown) to the main frame 18.

The housing 158 contains an axially movable rod member 176 carrying an ejecting plate 178 beyond the end of the housing 158. Reciprocation of the rod 176 and ejecting plate 178 is effected by fluid pressure motor 180 contained within the housing 158 and including a reciprocable piston 182 connected to the rod 176.

Each pattern plate 21 carries a plurality of ejector pins 184 which extend therethrough and are secured at one end to a base plate 186. A plurality of springs 188 act between the pattern and the base plate 186 to bias the ejector pins 184 to inactive position. Thus, when the piston 182 of the motor 180 is extended, the ejecting plate 178 is moved into engagement with the base plate 186, moving the same against the bias of the springs 188 and forcing the ejector pins 184 through the pattern plate 21 to eject a finished mold therefrom.

To prevent binding of the pins 184 in the pattern plate 21, means is provided for aligning the pins with the reciprocable rod 176 so that they will move along substantially parallel axes. This means takes the form of a movable frame member 190 which is engageable with the patterns support frame 22 for orienting the same prior to an engagement of the base plate 186 by the ejecting plate 178.

The frame member 190 is movable with the ejecting plate 178 and is connected thereto by a yieldable override mechanism. The override mechanism comprises a plurality of pins 192 depending from the ejecting plate 178 and slidably extending through suitable apertures formed in the frame member 190. A plurality of springs 194 acting between the frame member 190 and suitable collars 196 carried on the pins 192 normally maintain the frame member 190 in engagement with the ejecting plate 178. However, the springs 194 are adapted to yield to permit the ejecting plate 178 to move away from the frame 190 and into engagement with the base plate 186 after the frame member 190 engages the pattern support frame 22.

In operation, extension of the piston 182 of the motor 180 moves the frame member 190 into engagement with the pattern support frame 22 to prevent pivotal movement thereof about the trunnions 24 and correctly orient the same relative to the ejecting plate 178. Further movement of the piston 182 of the motor 180 moves the ejecting plate 178 into engagement with the base plate 186 to actuate the same and eject a finished mold from the pattern plate as hereinbefore described.

It will be apparent that the mold ejection mechanism 156 may be positioned as shown with the axis of the cylindrical element 158 extending generally upward to facilitate manual removal of finished molds upon ejection thereof from the pattern plates. On the other hand, the ejection mechanism 156 may be adjusted with the axis of the cylindrical element 158 extending generally downward so that upon ejection, the finished molds will simply drop off the pattern plate. The latter arrangement is particularly suited for automatic operation since, with the ejecting mechanism 156 in such lower position, finished molds may be easily deposited upon a conveyer (not shown) or the like for transportation to storage or casting areas.

*Conveyer actuating and indexing mechanism*

Means is provided for actuating the conveyer 10 and moving the chains 12 through a generally elliptical path in predetermined increments at selected intervals of time. To insure smooth starting and stopping of the conveyer 10, the actuating means preferably takes the form of a Geneva drive 198. The Geneva drive, as shown in Figs. 1 and 2, is positioned at the end of the conveyer 10 remote from the ejector mechanism 156 and adjacent one set of main gear wheels 16. The chain supporting gear wheels 16 are mounted on an axle 200 for rotation therewith and the axle 200 extends beyond one of the gear wheels 16 into operative engagement with the Geneva mechanism 198.

Figure 6:
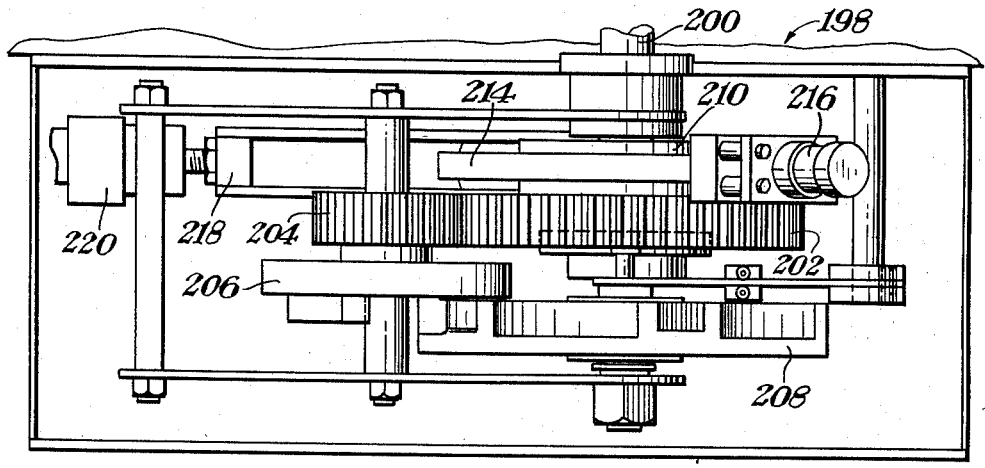
Fig. 6 is an enlarged fragmentary plan view of the indexing means.
Figure 7:
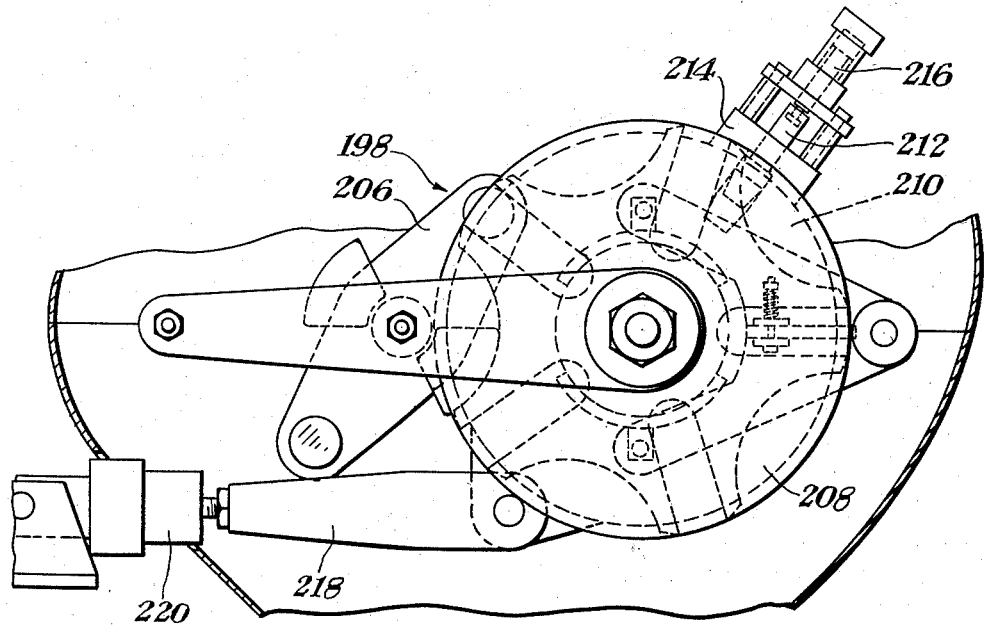
Fig. 7 is a fragmentary elevation of the indexing mechanism shown in Fig. 6 with a portion thereof broken away.

As best shown in Figs. 6 and 7, the Geneva drive comprises a gear 202 loosely mounted on the axle 200 and meshing with an idler gear 204. The idler gear 204 is directly connected to a rotatable crank 206 which in turn engages a star wheel 208 mounted in torque transmitting relation with the axle 200.

A ratchet wheel 210 is connected directly to the gear 202 and is loosely mounted upon the axle 200. A power operated pawl 212 is mounted in a driving lever 214 for engagement with the ratchet wheel 210. The driving lever 214 is pivotally mounted on the axle 200 adjacent the ratchet wheel 210 and carries a fluid pressure operated piston motor 216 on one end thereof. The piston of the motor 216 is connected to the pawl 212 and is adapted to move the pawl into and out of engagement with the ratchet wheel 210. The other end of the driving lever 214 is pivotally connected to the piston 218 of a main driving fluid pressure motor 220 so that reciprocation of the piston 218 will cause oscillation of the lever 214 about the axle 200.

In operation, the various parts of the Geneva drive 198 are initially in the position shown in Figs. 6 and 7 and movement of the piston 218 to the right as viewed in these figures will move the driving lever 214 in a counterclockwise direction. Since the pawl 212 is in engagement with the ratchet wheel 210, counterclockwise movement will be transmitted directly to the ratchet wheel 210 and the gear 202. The idler gear 204 will therefore be moved in a clockwise direction to rotate the crank 206 which in turn will impart initially accelerating and subsequently decelerating clockwise movement to the star wheel 208. This movement of the star wheel 208 is transmitted directly to the axle 200 and to the main chain support gear wheels 16, the chains 12 being thereby advanced through a predetermined distance.

Fluid pressure is then admitted to the pawl actuating motor 216 to withdraw the pawl 212 from the ratchet wheel 210 and the piston 218 of the main driving motor 220 is retracted to its initial position. Such movement of the piston 218 rotates the driving lever 214 in a clockwise direction, as viewed in Fig. 7, and positions the pawl 212 in registry with another detent recess in the ratchet wheel 210. The pawl actuating fluid pressure motor 216 then actuates the pawl 212 to move the same into engagement with the ratchet wheel 210 and the driving mechanism is once again positioned to impart an increment of movement to the chains 12.

Since it may be desirable to utilize the hereinbefore described apparatus for small production runs with pattern plates applied to a limited number of pattern support frames 22, means operatively associated with the indexing mechanism is provided for preventing the loading operation when selected pattern support frames are at the loading station. This means is shown in Figs. 1, 2 and 3 as comprising a rotatable cam plate 221 connected to the axle 162 of the main gear wheels 16 through a gear train 222.

Carried on the cam plate 221 is a plurality of radially adjustable, circumferentially spaced cam elements 224 which are cooperable with a three-way switch 226 for controlling the loading operation. The cam elements 224 are uniformly spaced on the plate 221 and the reduction ratio of the gear train 222 is such that the cam elements 224 move sequentially into alignment with the switch 226 as the pattern support frame 22 moves respectively into the loading station. Thus, each pattern support frame 22 has a corresponding cam element 224 which moves into alignment with the switch 226 simultaneously with movement of its associated pattern support frame 22 into the loading station.

The cam elements 224 are proportioned to clear the switch 226 in a retracted position and to engage the switch 226 for operating the same when in a radially extended position. Thus, the cam elements 224 may be radially adjusted relative to the plate 221 to actuate the switch 226 in response to movement of any selected pattern support frame 22 into the loading station. The structural relation between the switch 226 and the hopper 84 will be more fully described hereinafter.

Control system

Referring to Fig. 15 showing the control mechanism for accomplishing the various functions of the hereinbefore described apparatus, it should be observed that both fluid pressure and electrical energy are utilized. Details of the fluid pressure and electrical control systems will be brought out in a description of the operation of the apparatus which follows.

Operation

In general terms, the steps which comprise the operation of the apparatus of this invention are as follows:

(1) A preheated pattern is positioned at the loading station and the flask 112 is lowered onto the same.

(2) The gate 98 opens and permits a quantity of inorganic molding material to be dropped onto the pattern plate to be retained by the flask 112.

(3) The flask 112 moves upward and the pattern support frame 22 in the loading station is rotated through 360° to dump excess mold forming material from the pattern 21 and return the same to its original position, excess mold forming material thus dumped being removed by the conveyer 159.

(4) The conveyer 10 is actuated or indexed to move the pattern plate with the mold forming material thereon into the curing oven 70 while simultaneously moving a preheated pattern plate out of the preheat oven 80 to the loading station.

(5) The above steps are repeated with each indexing step moving a pattern plate with a cured mold thereon out of the curing oven 70 to the unloading station where the finished mold is ejected therefrom. Each indexing step also moves a pattern out of the preheat oven 80 to the loading station beneath the flask 112.

The detailed operation of the apparatus is as follows:

Assuming that a pattern plate is positioned in the loading station beneath the flask 112 which is in its raised position and referring more particularly to Fig. 15, operation of the apparatus is initiated by the operator's closing a main line switch 228 to connect the control system to a source of power, here shown as line wires L1, L2, and momentarily closing a switch 230 which energizes the coil 232 of a solenoid operated four-way valve 234 through a circuit which may be traced as follows: from line wire L1 through switch 228, wire 236, coil 232, wire 238, switch 230, wire 240, a switch 242, wire 244, and switch 228 to line wire L2.

Energization of the coil 232 positions the valve 234 and to admit motive fluid to the motor 216 of the Geneva mechanism 198 causing the same to apply power to the pawl 212 and move the same into engagement with the ratchet wheel 210.

The motive fluid is a liquid pumped from a tank 246 by a pump 248 and distributed to the various control vales through a manifold 250. An exhaust manifold 252 collects motive fluid discharged from the various fluid pressure motors through the control valves and conducts such fluid back to the tank 246.

A double-pole, double-throw switch 254 is arranged to be actuated by the pawl 212 when the same moves into and out of engagement with the ratchet wheel 210. When the pawl 212 moves into engagement with the ratchet wheel 210, the switch 254 is positioned to complete a circuit which may be traced as follows: from line wire L1 through switch 228, wire 236, wire 256, a solenoid coil 258, wire 260, switch 254, wire 264, a safety control circuit indicated generally by the reference numeral 266 and which will be more fully described hereinafter, wire 268, a switch 270, wire 272, wire 244, and switch 228 to line wire L2.

The solenoid coil 258 is operatively associated with a four-way valve 274 which controls the flow of motive fluid to and from the main Geneva drive motor 220. When the solenoid coil 258 is energized, the valve 274 is positioned to admit fluid under pressure to the motor 220 and extend the piston 218 thereof. As the piston 218 moves out of the motor 220, it imparts angular movement to the driving lever 214 which in turn imparts limited rotational movement to the ratchet wheel 210 and crank 206. Such movement of the crank 206 causes predetermined angular movement of the axle 200 of the main conveyer sprocket gear wheel 17 by transmitting torque thereto through the star wheel 208. Such movement of the main gear wheel 16 will move the chains 12 through a selected increment and will move a pattern plate 21 into the loading station beneath the flask 112.

A switch 276 is arranged to be momentarily closed by the Geneva drive 198 when the same completes the indexing operation above described. Closing of the switch 276 energizes a solenoid coil 278 through a circuit which may be traced as follows: from line wire L1, through switch 228, wire 236, wire 280, coil 278, wire 282, switch 276, wire 284, wire 244, and switch 228 to line wire L2. The solenoid coil 278 is operatively associated with the valve 234 and, when energized, positions the valve 234 to admit motive fluid to the motor 216 in such a way as to cause the same to move the pawl 212 out of engagement with the ratchet wheel 210.

As the pawl 212 moves out of engagement with the ratchet wheel 210, the switch 254 is actuated to energize a solenoid coil 286 through a circuit which may be traced as follows: from line wire L1 through switch 228, wire 236, wire 288, coil 286, wire 290, switch 254, wire 292, wire 244 and switch 228 to line wire L1. The solenoid coil 286 is operatively associated with the four-way valve 274 and, when energized, positions the valve 274 to admit fluid under pressure to the main Geneva drive motor 220 to cause the same to return the piston 218 to its initial position, the piston 218 carrying with it the pawl 212 and pawl motor 216 to return the same to their initial positions. The Geneva drive mechanism 198 is now in position for another indexing operation.

A switch 294 is positioned at the loading station and adapted to be momentarily closed by a pattern as the same moves into position beneath the flask 112. When the switch 294 closes, it energizes a solenoid coil 296 through a circuit which may be traced as follows: from line wire L1 through switch 228, wire 236, wire 298, coil 296, wire 300, switch 294, wire 302, a portion of three-way switch 226, wire 304, wire 244, and switch 228 to line wire L2.

The solenoid coil 296 is operatively associated with a four-way valve 306 which controls the flow of motive fluid to and from the flask actuating motor 126. When the coil 296 is energized, the valve 306 is positioned to admit fluid under pressure to the motor 126 causing the same to extend the piston 128 thereby lowering the flask 112 onto the pattern plate aligned therewith.

A normally closed switch 308 is arranged to be moved to open position by the flask 112 when the same moves to its lowered position to thereby break an energizing circuit for a solenoid coil 310 which circuit may be traced as follows: from line wire L1 through switch 228, wire 236, wire 312, coil 310, wire 314, switch 308, wire 315, wire 244, and switch 228 to line wire L2.

The solenoid coil 310 is operatively associated with a four-way spring loaded valve 316 arranged to control the flow of motive fluid to and from the gate actuating motor 97. When the solenoid 310 is energized, the valve 316 is positioned to admit fluid under pressure to the motor 97 in such a manner as to hold the gate 98 in its closed position. However, when the switch 308 is opened to de-energize the coil 310, the spring loaded valve 316 moves to a position wherein fluid is admitted to the motor 97 in such a manner as to retract the piston 99 thereof and move the gate 98 to open position. When the gate 98 is moved to open position, mold forming material is discharged onto the surface of the pattern plate where it is retained by the flask 112.

A second switch 396 is arranged to be closed by the flask 112 when the same moves into engagement with the pattern plate and, when closed, the switch 396 completes a circuit through a timing device 318 which may be traced as follows: from line wire L1, through switch 228, wire 236, wire 320, timing device 318, switch 396, wire 322, wire 244, and switch 228 to line wire L2.

The timing device 318 includes a solenoid coil 324 which is adapted to be energized at the end of a predetermined period following closing of the switch 396. The coil 324 is operatively associated with a switch 326 which in turn controls energization of a solenoid coil 328.

When the solenoid coil 324 is energized by the timer 318, the switch 326 is closed, thereby completing an energizing circuit which may be traced as follows: from line wire L1 through switch 228, wire 236, wire 330, coil 328, wire 332, switch 326, wire 334, wire 244, and switch 228 to line wire L2.

The solenoid coil 328 is operatively associated with the four-way valve 306 controlling the flow of motive fluid to and from the flask actuating motor 126. When the coil 328 is energized, the valve 306 is positioned to admit fluid to the motor 126 in such a manner as to retract the piston 128 and move the flask 112 to its upper position out of engagement with the pattern plate. The pattern plate is now free to be rolled over to dump excess mold forming material therefrom and it will be apparent that the timed period during which the flask 112 remains in engagement with the pattern plate will determine the degree to which mold forming material builds up on the pattern plate and thus will determine the thickness of the finished shell mold.

The switch 396 is also arranged to be opened by the flask 112 when the same reaches its uppermost position so that the timer 318 will be reset with the coil 324 deenergized and ready for another cycle.

The four-way valve 306 is also operatively associated with the fluid pressure motor 180 of the mold ejecting mechanism 156, being arranged to admit motive fluid to the motor 180 to extend the piston 182 and eject a finished mold while the solenoid coil 296 is energized and the flask 112 is moving downward. The valve 306 is also arranged to admit motive fluid to the motor 180 to retract the piston 182 while the solenoid coil 328 is energized and the flask 112 is moving away from the pattern plate to its uppermost position.

Another switch 336 is arranged to be momentarily closed by the flask 112 as the same reaches its uppermost position. The switch 336 controls the energization of a pair of solenoid coils 338 and 340 which in turn control the operation of the roll-over motor 158 through a four-way valve 342. The coils 338 and 340 are operatively associated with the valve 342 in such a manner that energization of the coil 338 will position the valve 342 to admit motive fluid to the roll-over motor 157 and cause extension of the piston 155 thereof. On the other hand, energization of the coil 340 will position the valve 342 to admit motive fluid to the roll-over motor 157 in such a manner as to cause retraction of the piston 155. Thus, when the coil 338 is energized, the pattern plate positioned beneath the flask 112 will be rotated through 360° in a counterclockwise direction, as viewed in Fig. 12, and when the coil 340 is energized, the pattern plate positioned beneath the flask 112 will be rotated through 360° in a clockwise direction as viewed in Fig. 12.

It will therefore be apparent that each of the coils 338, 340 must be alternatively operative as the pattern plates move sequentially through the loading station. To effect such alternative operation of the coils 338 and 340, a double-pole, double-throw switch 342 is arranged to be actuated by the quadrant gear 154 of the roll-over mechanism 142, the switch 342 being arranged to connect the switch 336 in series circuit with the coil 338 when the quadrant gear 154 is in the position shown in Fig. 12 and to connect the switch 336 in series circuit with the coil 340 when the quadrant gear is rotated in a counterclockwise direction through 90° from the position shown in Fig. 12.

With the apparatus in the position shown, closing of the switch 336 by movement of the flask 112 to its uppermost position will complete an energizing circuit for the coil 338 which may be traced as follows: from line wire L1 through switch 228, wire 236, wire 344, coil 338, wire 346, switch 342, wire 348, wire 350, switch 336, wire 352, wire 244, and switch 228 to line wire L2.

However, in the event the quadrant gear 154 is 90° removed from the position shown in Fig. 12 with the piston 155 of the motor 157 extended when the flask 112 moves to its uppermost position, the coil 340 will be energized through a circuit which may be traced as follows: from line wire L1 through switch 228, wire 236, wire 354, coil 340, wire 356, switch 342, wire 358, wire 350, switch 336, wire 352, wire 244, and switch 228 to line wire L2.

The switch 270 is also arranged to be closed by the flask 112 when the same reaches its uppermost position and when so closed completes an energizing circuit for a timing mechanism 360 which circuit may be traced as follows: from line wire L1 through switch 228, wire 236, timer 360, wire 362, switch 270, wire 272, wire 244, and switch 228 to line wire L2.

The timer 360 includes a solenoid coil 364 which is adapted to be energized at the end of a predetermined period after the hereinbefore traced energizing circuit for the timer 360 has been completed. The coil 364 is operatively associated with a normally closed switch 366 and also with the starting switch 230 and when energized is adapted to open and close these switches respectively.

The switch 366 controls energization of a solenoid coil 368 which in turn controls operation of the measuring gate actuating motor 110 through a spring loaded four-way valve 370. When the solenoid coil 368 is energized, the valve 370 is maintained in a position to admit motive fluid to the motor 110 to hold the piston 108 thereof in the retracted position as shown in Fig. 4 so that the measuring gate 101 will be maintained in its closed position. However, the valve 370 is spring loaded so that upon deenergization of the coil 368, the valve assumes a position wherein motive fluid is admitted to the motor 110 to extend the position 108 thereof and swing the gate 101 to its open position, thereby permitting a charge of mold forming material to be dumped from the hopper 86 onto the gate 98.

When the switch 366 is closed, the coil 368 is energized through a circuit which may be traced as follows: from line wire L1 through switch 228, wire 236, wire 372, coil 368, wire 374, switch 366, wire 376, switch 270, wire 272, wire 244, and switch 228 to line wire L2.

Thus, when the flask moves to its uppermost position to close the switch 270, the timer 360 is energized and, after a predetermined period, the solenoid coil 364 thereof opens the switch 366 to break the above traced energizing circuit for the coil 368 permitting the valve 370 to return to a position wherein motive fluid is admitted to the motor 110 to open the measuring gate 101. On the next cycle of the apparatus, the switch 270 is opened as the flask 112 moves downward so that the coil 364 is deenergized and the timer 360 is reset.

As hereinbefore pointed out, the switch 230 is operatively associated with the coil 364 of the timing device 360 and is closed when the timer 360 causes the coil 364 to be energized. Thus, energization of the coil 364 will cause the entire apparatus to recycle.

Referring more particularly to the safety control circuit 266, the same is here shown as comprising a pair of pressure actuated switches 376, 378 connected in parallel with each other and connected respectively in series with the contacts of a single-pole, double-throw switch 380.

The switch 380 is similar to the switch 342 in that it is moved between its limiting positions by the quadrant gear 154 of the roll-over mechanism 142, the contacts thereof being closed only when the quadrant gear 154 is in its limiting positions.

The pressure responsive switches 376 are connected to the motive fluid supply conduit of the roll-over motor 158 by suitable conduit means 377, 379. The conduit means 377, 379 are such that the switch 376 is closed when motive fluid is admitted to the motor 157 to roll the pattern in one direction, and the switch 378 is closed when fluid pressure is admitted to the roll-over motor 157 to roll the pattern in the other direction. The entire parallel circuit 266 is connected in series with the solenoid coil 258 which must be energized before the main Geneva drive motor 220 can effect indexing of the conveyor 10.

In operation, the start of the roll-over operation will cause the fluid pressure effecting the roll-over to close either switch 376 or 378. However, energization of the coil 258 is precluded until the roll-over is completed to position the switch 380 in the appropriate position.

Assuming that the component parts of the circuit 266 are in the position shown in Fig. 15 and motive fluid is admitted to the roll-over motor 158 to start the roll-over operation, this will cause closing of the switch 378 and opening of the switch 376 to completely disconnect the solenoid coil 258 from the source of power. Upon completion of the roll-over, the switch blade of the switch 380 is moved to the left as viewed in Fig. 15 to complete the circuit between the wires 264 and 268 thereby permitting the energizing circuit for the solenoid coil 258 to be completed upon appropriate movement of the pawl actuated switch 254. It will therefore be apparent that indexing of the conveyor 10 is prevented unless the pattern is accurately positioned and in condition for such indexing operation.

As hereinbefore pointed out, the switch 226, operatively associated with the cam plate 220, is operable for preventing the loading operation when selected pattern support frames are at the loading station. The switch 226 is arranged to be actuated by the cam elements 224 carried on the cam plates 220 and is preferably a combination of three switches arranged to be simultaneously actuated by the cam elements 224 and designated in Fig. 15 by the reference numerals 226a, 226b, and 226c.

The switch 226a is normally open and is connected in parallel with the starting switch 230. Thus, when the switch 226a is closed by a selected one of the cam elements 224, the solenoid coil 232 is energized in the same manner as it would have been had the switch 230 been closed and the indexing operation is initiated.

The switch 226b is normally closed and is connected in series with the switch 294 which controls energization of the solenoid coil 296. Since the solenoid coil 296 is effective when energized to move the flask 112 downward, and is normally energized when a pattern support frame moves into the loading station, opening of the switch 226b by a cam element 224 will prevent energization of the coil 296 despite closing of the switch 294 and will prevent downward movement of the flask 112.

The switch 226c is connected in parallel with the switch 308 which controls energization of the solenoid coil 310. Since the switch 308 is normally closed and is opened to deenergize the coil 310 and permit the motor 97 to open the charging gate 98, the switch 226c is arranged to be closed by a selected cam 224 to maintain the energizing circuit for the coil 310 completed and prevent opening of the charging gate 98.

In the event it is decided to prevent any deposition of mold forming material on the patterns during the warm-up period or the like, a manually operable switch 382 is connected in parallel with the switch 308. When the switch 382 is closed, the coil 310 will remain energized throughout the operating cycle and the gate 98 will remain closed.

It will be understood that as each pattern is indexed out of the preheat oven 80 to the loading station, a loaded pattern plate is indexed from the loading station into the curing oven 70 and a pattern plate with a cured mold thereon is indexed to the ejection or unloading station where the finished mold is ejected from the pattern plate by the ejector pins 184. It is also to be understood that the described indexing operation is effected to move the pattern plates from the ejection station through the preheat oven 80 to the loading station.

The operation is thus continuous and automatic under the control of a single operator since, while an ejecting operation is being conducted, the loading, dumping, baking and preheating operations are being performed at the other stations.

It will be apparent that many changes may be made in the details of construction and arrangement of parts and that certain phases of the cycle may be rearranged or omitted without departing from the scope of the invention as defined in the appended claims.

We claim:

1. Mold forming apparatus comprising in combination, spaced pulley means positioned for rotation on substantially horizontal axes, an endless conveyer mounted on said pulley means for movement in a substantially fixed path, support means pivotally mounted on said conveyer, pattern means secured to said support means, loading means above said conveyer for loading mold forming material on said pattern means, means for rotating said support means on said conveyer for dumping excess mold forming material from said pattern means, oven means above said conveyer defining a heated zone for curing mold forming material on said pattern means, and ejector means for removing finished molds from said pattern means after passage through said zone.

2. Mold forming apparatus comprising in combination, spaced pulley means positioned for rotation on substantially horizontal axes, an endless conveyer mounted on said pulley means for movement in a fixed path, support means pivotally mounted on said conveyer, pattern means secured to said support means, loading means above said conveyer for loading mold forming material on said pattern means, means for rotating said support means on said conveyer for dumping excess mold forming material from said pattern means, oven means above said conveyer defining a heated zone for curing mold forming material on said pattern means, second oven means beneath said conveyer for preheating said pattern means as said conveyer moves the same to said loading means, and ejector means for removing finished molds from said pattern means after passage through said zone.

3. Mold forming apparatus comprising in combination, spaced pulley means positioned for rotation on substantially horizontal axes, an endless conveyer mounted on said pulley means for movement along a fixed path, a plurality of support means pivotally mounted on said conveyer, a plurality of patterns secured to said support means respectively, means for intermittently actuating said conveyer to move said patterns along said path in selected increments at predetermined intervals of time, loading means above said conveyer for sequentially loading mold forming material on said patterns, means for rotating said support means on said conveyer for dumping excess mold forming material from said pattern means, oven means above said conveyer defining a heated zone for curing mold forming material on said pattern means, and ejector means for removing finished molds from said pattern means after passage through said zone.

4. Mold forming apparatus as claimed in claim 3 wherein a second oven means is provided beneath said conveyer for preheating said pattern means as said conveyer moves the same to said loading means.

5. Mold forming apparatus as claimed in claim 3 wherein said means for rotating said support means is positioned between said loading means and said oven means to be cooperable with one of said support means while another of said support means is positioned beneath said loading means.

6. Mold forming apparatus comprising in combination, spaced sprocket means positioned for rotation on substantially horizontal axes, a conveyer including a pair of spaced endless chains mounted on said sprocket means for parallel movement in a substantially fixed path, a plurality of supporting frames respectively mounted between said chains for pivotal movement relative thereto about substantially horizontal axes, a plurality of patterns secured to said frames respectively, detent means for preventing rotation of said frames relative to said chains, means for intermittently actuating said conveyer to move said patterns along said path in selected increments at predetermined intervals of time, loading means above said conveyer for sequentially loading mold forming material on said patterns, means for releasing said detent means and rotating said support means for dumping excess mold forming material from said patterns, oven means above said conveyer defining a heated zone for curing mold forming material on said pattern means, and ejector means for removing finished molds from said pattern means after passage through said zone.

7. Mold forming apparatus as claimed in claim 6 wherein said means for rotating said support means is positioned between said loading means and said oven means to be cooperable with one of said support means while another of said support means is positioned beneath said loading means.

8. Mold forming apparatus comprising in combination, a conveyer having a plurality of support means movable along a substantially fixed path and adapted to support a plurality of patterns respectively, means for intermittently actuating said conveyer to move said pattern means along said path in predetermined increments at selected intervals of time, loading means at a loading station adjacent said conveyer, means for controlling said loading means for sequentially loading mold forming material on selected patterns, said last named means including adjustable means for preventing said loading operation while selected support means are in said loading station, means for rotating said support means on said conveyer for dumping excess mold forming material from said patterns, oven means adjacent said conveyer defining a heated zone for curing mold forming material on said pattern means, and ejector means for removing finished molds from said pattern means after passage through said zone.

9. Mold forming apparatus comprising in combination, a conveyer, at least one frame pivotally mounted on said conveyer and adapted to support pattern means thereon, a hopper for mold forming material adjacent said conveyer and adapted to be positioned above said pattern means in at least one position thereof, reciprocable flask means between said hopper and said conveyer, means for moving said flask means into operative engagement with said pattern means, means for discharging a predetermined quantity of mold forming material from said hopper while said flask means is in operative engagement with said pattern means, means for moving said flask means out of operative engagement with said pattern means, and means for pivoting said frame on said conveyer for dumping excess mold forming material from said pattern plate after said flask means has moved out of operative engagement therewith.

10. Mold forming apparatus as claimed in claim 9 wherein said flask actuating means includes motor means and a resilient connection between said motor means and said flask means.

11. Mold forming apparatus comprising in combination, a conveyer, a plurality of frames adapted to support pattern means thereon, means for pivotally mounting said frames on said conveyer, said last named means including bearing means carried by said frame, and latching means for releasably securing said bearing means to said conveyer.

12. Mold forming apparatus as claimed in claim 11 wherein said latching means includes a detent element biased to a latching position, said detent element being manually operable against said bias to a released position.

13. Mold forming apparatus comprising in combination, a conveyer, at least one frame pivotally mounted on said conveyer and adapted to support a pattern plate thereon, means including a reciprocable member operatively associated with said pattern plate for ejecting a shell mold therefrom, means for actuating said last named means including a reciprocable element movable into operative engagement with said member, and means operable substantially simultaneously with said last named means for aligning said member and said element, said last named means comprising reciprocable abutment means movable into engagement with said frame for preventing pivotal movement thereof.

14. Mold forming apparatus comprising in combination, a conveyer, at least one frame pivotally mounted on said conveyer and adapted to support a pattern plate thereon, means including a reciprocable member operatively associated with said pattern plate for ejecting a shell mold therefrom, means for actuating said last named means including a reciprocable element movable into operative engagement with said member, means operable substantially simultaneously with said last named means for aligning said member and said element, said last named means comprising reciprocable abutment means movable into engagement with said frame for preventing pivotal movement thereof, and yieldable means for connecting said abutment means to said reciprocable element for movement therewith, said abutment means being positioned to engage said frame prior to engagement of said member by said element.

References Cited in the file of this patent

UNITED STATES PATENTS

| | | |
|---|---|---|
| 1,108,694 | Burkhardt | Aug. 25, 1914 |
| 2,049,967 | Luton | Aug. 4, 1936 |
| 2,526,797 | Ashbaugh | Oct. 24, 1950 |
| 2,695,431 | Davis | Nov. 30, 1954 |
| 2,669,758 | Valyi | Feb. 23, 1954 |
| 2,765,506 | Klampe et al. | Oct. 9, 1956 |

OTHER REFERENCES

Foundry, November 1952, page 265.
The Iron Age, Nov. 15, 1952, pages 109–113.